United States Patent [19]
Miller et al.

[11] Patent Number: 5,442,371
[45] Date of Patent: Aug. 15, 1995

[54] SIMPLIFIED IMAGE RECONSTRUCTION INTERFACE

[75] Inventors: David W. Miller, Longmont, Colo.; Larry A. Nelson, Bellevue, Wash.; Ronald C. Robinder, Albuquerque, N. Mex.

[73] Assignee: Honeywell Inc., Minneapolis, Minn.

[21] Appl. No.: 127,565

[22] Filed: Sep. 27, 1993

[51] Int. Cl.⁶ .................................................. G09G 3/36
[52] U.S. Cl. ........................................ 345/98; 348/448; 348/446
[58] Field of Search ................ 345/150, 151, 152, 153, 345/154, 155, 98, 99; 348/448, 446, 450

[56] References Cited

U.S. PATENT DOCUMENTS

| | | | |
|---|---|---|---|
| 4,724,487 | 2/1988 | Casey | 358/183 |
| 4,814,873 | 3/1989 | Maekawa | 348/448 |
| 4,816,915 | 3/1989 | Imai et al. | 358/183 |
| 4,930,014 | 5/1990 | Maeda et al. | 358/209 |
| 4,935,815 | 6/1990 | Ichikawa et al. | 348/448 |
| 5,111,297 | 5/1992 | Tsuji et al. | 358/183 |
| 5,237,396 | 8/1993 | Kayashima et al. | 348/448 |
| 5,257,103 | 10/1993 | Vopeley et al. | 348/448 |

FOREIGN PATENT DOCUMENTS

| | | |
|---|---|---|
| 0241284 | 10/1987 | European Pat. Off. . |
| 0262647 | 4/1988 | European Pat. Off. . |
| 0291252 | 11/1988 | European Pat. Off. . |
| 0350234 | 1/1990 | European Pat. Off. . |
| 0462396 | 12/1991 | European Pat. Off. . |

OTHER PUBLICATIONS

"Electrical Performance Standards—Monochrome Television Studio Facilities," *EIA Standard*, RS-170, pp. 1-11, published by Electronic Industries Association, Engineering Dept., New York (Nov. 1957).

*Primary Examiner*—Ulysses Weldon
*Assistant Examiner*—Matthew Luu
*Attorney, Agent, or Firm*—John P. Sumner; Craig J. Lervick

[57] ABSTRACT

A video interface apparatus for converting an incoming interlaced video signal to an outgoing non-interlaced video signal for an LCD flat panel with an arbitrary number of rows and columns. The incoming video signal is digitized and stored in a memory. An address generator creates addresses for reading and writing data from and into the memory, and the resulting read data is used to reconstruct the digital signal into an image for display on the LCD flat panel.

18 Claims, 3 Drawing Sheets

SIMPLIFIED IMAGE RECONSTRUCTION INTERFACE

FIELD OF THE INVENTION

The present invention pertains generally to a device for displaying a picture, and more particularly to an electronic interface for converting an interlaced video signal to a liquid-crystal display (LCD) flat panel with an arbitrary number of rows and columns.

BACKGROUND OF THE INVENTION

Flat panel displays, and particularly LCD panels, have generally been fabricated in the past such that there is a 1:1 correspondence between the display surface geometry and the image pixel geometry. This leads to very high data rates for LCD panels that have many pixels and display a wide number of grey scale levels. With these display systems, any improvements in imaging or in panel production capability require a redesign of the entire display system.

Conversely, cathode ray tube (CRT) displays have used a well-defined series of interface standards, such as the Electronic Industries Association (EIA) RS-170 and RS-343 standards, to support displays of varying sizes and with varying performance tradeoffs. Previously disclosed flat panel LCD interfaces have required high speed video data processing in order to scan the image onto LCD panels of varying sizes and pixel counts. Such interfaces also require scanning video information onto an LCD flat panel using a non-interlaced standard with a refresh rate that is high enough to be above the flicker fusion frequency of the human eye.

Therefore, there is a need for a video interface to convert an incoming interlaced video signal to an outgoing non-interlaced video signal for an LCD flat panel with an arbitrary number of rows and columns.

SUMMARY OF THE INVENTION

The present invention provides a video interface apparatus for converting an incoming interlaced video signal to an outgoing non-interlaced video signal for an LCD flat panel with an arbitrary number of rows and columns. The incoming video signal is digitized and stored in a memory. An address generator creates addresses for reading and writing data from and into the memory, and the resulting read data is used to reconstruct the digital signal into an image for display on the LCD flat panel.

DETAILED DESCRIPTION OF THE PREFERRED EMBODIMENTS

Figure 1:
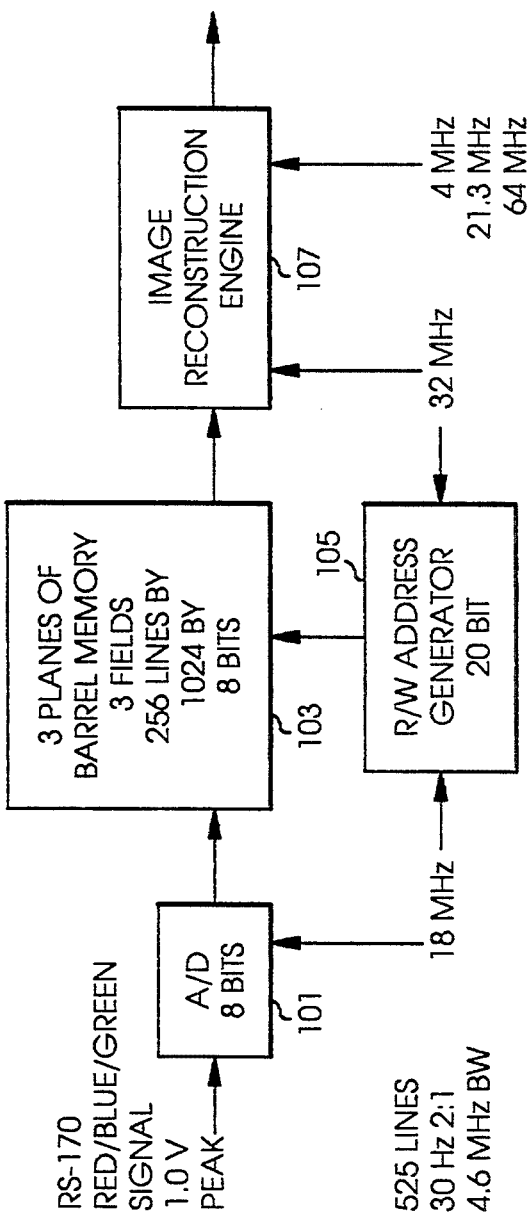
FIG. 1 is a block diagram showing an electronic video interface compatible with the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

For the purpose of this description, it is assumed that the described components, timings, frequencies and signals are compatible with those required to convert a standard RS-170 video signal for display on an LCD flat panel with a resolution of 1024×1024 pixels. However, it will be recognized that the present invention is not limited to the preferred embodiment described below and may be readily adapted to other video signals, either color or monochrome, and flat panel display resolutions, either greater than or less than the incoming video signal, without loss of generality.

A typical video signal input converted by the present invention is described in the published Electronic Industries Association (EIA) RS-170 document, which describes the video signal standard currently used by the civilian television broadcast industry. The RS-170 video signal provides for 525 horizontal scan lines, a 2:1 interlace, a 30 Hz frame rate, and a 1.0 volt peak luminance level. Although not specifically defined in the published EIA specification, data in an RS-170 video signal is generally considered to be bandwidth limited to substantially 4.5 MHz. A color RS-170 video signal as currently used by the broadcast industry has three signal elements: red, green with composite synchronization, and blue.

In a particular instance of interest to the assignee of the present invention, Honeywell Inc., the input video signal comprises a modified RS-170 video signal where the signal levels are 2.4 volts peak luminance level, rather than the 1.0 volts of the RS-170 video standard, and the bandwidth is limited between 8 and 9 MHz. Bandwidth limiting is required in order to display a 484×484 point preferred digital map output with reasonable fidelity. The preferred embodiment of the present invention is designed to accommodate either the modified RS-170 video signal voltage level of 2.4 volts or the standard RS-170 video signal voltage level of 1.0 volts by means of a resistor pack or a switch.

The LCD flat panel display module of the preferred embodiment is manufactured by Honeywell Inc., and requires 1024 digital words of memory (each word is 8 bits wide) per horizontal scan line to store the LCD flat panel driver signal data, with 7 bits specifying the intensity of the signal and the last bit serving to identify drive polarity. This reversal of drive polarity is necessary for an LCD flat panel display to prevent damage to the panel. Row (source) drivers output video data to the horizontal scan lines of the LCD flat panel display, with the output voltage being at a negative power supply rail for a minimum input data value of 0 and at a positive power supply rail for a maximum input data value of 255. Consequently, the LCD flat panel driver signal data must be complemented periodically. As the LCD flat panel display has a response of input voltage to display contrast which is highly non-linear, a 5-to-8 bit look-up table is used to convert an incoming RS-170 video signal to an appropriate LCD flat panel driver signal.

Figure 3:
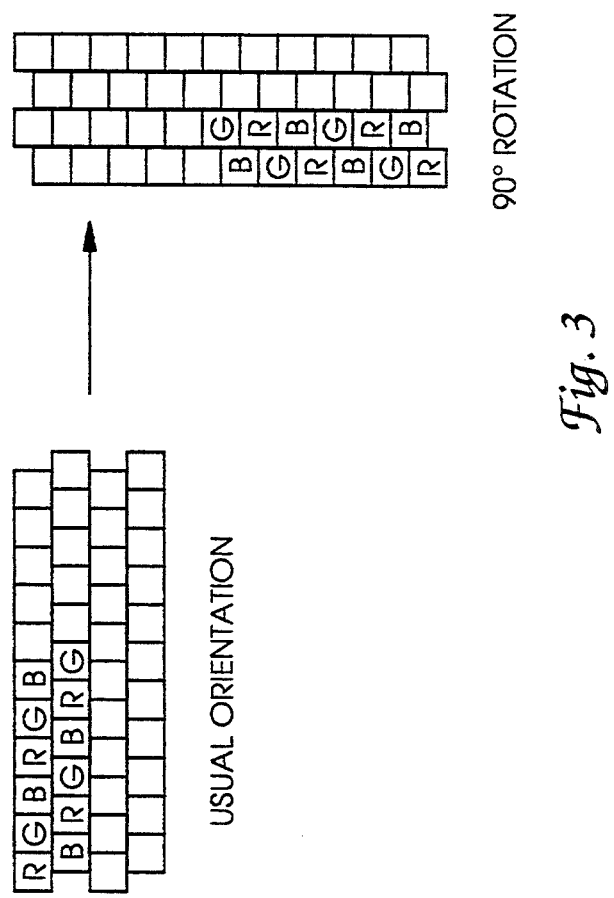
FIG. 3 is a block diagram showing an image rotation compatible with the present invention.

The LCD flat panel of the preferred embodiment has 1024 horizontal scan lines to be provided with information, and the panel is mounted orthogonally (rotated by 90°) to the usual orientation of a panel, as shown in FIG. 3. Due to the orthogonal mounting and an RGB triad dot structure to provide color, the horizontal rows of dots are staggered by 0.5 pixels. The LCD flat panel driver data is formatted into 16 channels of 64 horizontal rows for display on the panel. The data is applied to the row drivers, and a column is selected by corresponding column drivers.

The LCD flat panel display module of the preferred embodiment uses five basic clocks: 1) a reset pulse for the row drivers, 2) a four-phase clock operating at approximately 1 MHz, 3) first and second output signals, 4) a seed pulse (GD) for the column drivers, and 5) a shift clock (YSCL) for the column drivers.

FIG. 1 shows a typical scan conversion and image rotation interface. The composite synchronization signals of the green channel are stripped from the input video signal, and the horizontal and vertical synchronization pulses are used to keep a phase-locked-loop operating in proper phase to provide the required clocks. The clocks range from a 64 MHz data output clock to a 30 Hz output selection clock. A reset pulse for the row drivers is required which may be once per frame or once upon start-up of the display head.

After the synchronization has been stripped off the green channel, the three RGB channels are identical so the data manipulations for all three channels are handled in the same way. The description that follows is for each single color plane. Each block of the circuit is typically reproduced in triplicate in the interface unless specifically stated otherwise.

The RS-170 video input signal is first low-pass filtered to substantially 4.6 MHz. The filtering is typically used to minimize the introduction of aliasing effects during subsequent sampling and reconstruction steps. The input signal normally consists of 484 data points per horizontal scan line, and therefore a bright to dark to bright (or the converse) input signal represents a spatial frequency of 242 cycles per screen width. To convert this to bandwidth in the time domain, the number of cycles per scan line is divided by the time available to reproduce the scan line, which is approximately 52.5 microseconds for the RS-170 video signal standard. The calculation of 242 divided by $52.5 \times 10^{-6}$ seconds yields 4.6 MHz, the proposed limit for the video input.

The bandwidth limited signal is then converted from analog to digital form, using a flash analog to digital (A/D) converter 101 running at approximately 18 MSPS (megasamples per second), gated to run only during the active line time. This converts the 484 points per line of the input scan line sample to 1024 digital samples of the data on this line. Each digitized scan line sample is stored into a memory 103, with 240 to 242 scan line samples being digitized and stored for each field of input data.

In the preferred embodiment, the memory 103 used for storage of the input samples is a barrel shifted memory, with each field typically being stored separately. After the first and second fields have been stored, the third field is stored while the first two fields are read-out in a ping-pong fashion. The first field is then replaced by the fourth field, while the second and third are read out. Thus, all of the data will be read out each 1/60th of a second, with half of the data being updated each read-out. The LCD flat panel display is driven in a 60 Hz, non-interlaced fashion, while the input is 30 Hz, 2:1 interlaced.

In the preferred embodiment, 20 bits are used to address the memory by the read/write address generator 105, with 10 bits defining the memory location of each sample in a scan line, 8 bits providing scan line number addresses, and the remaining two bits being used modulo 3 to define the barrel position to be written.

Figure 2:
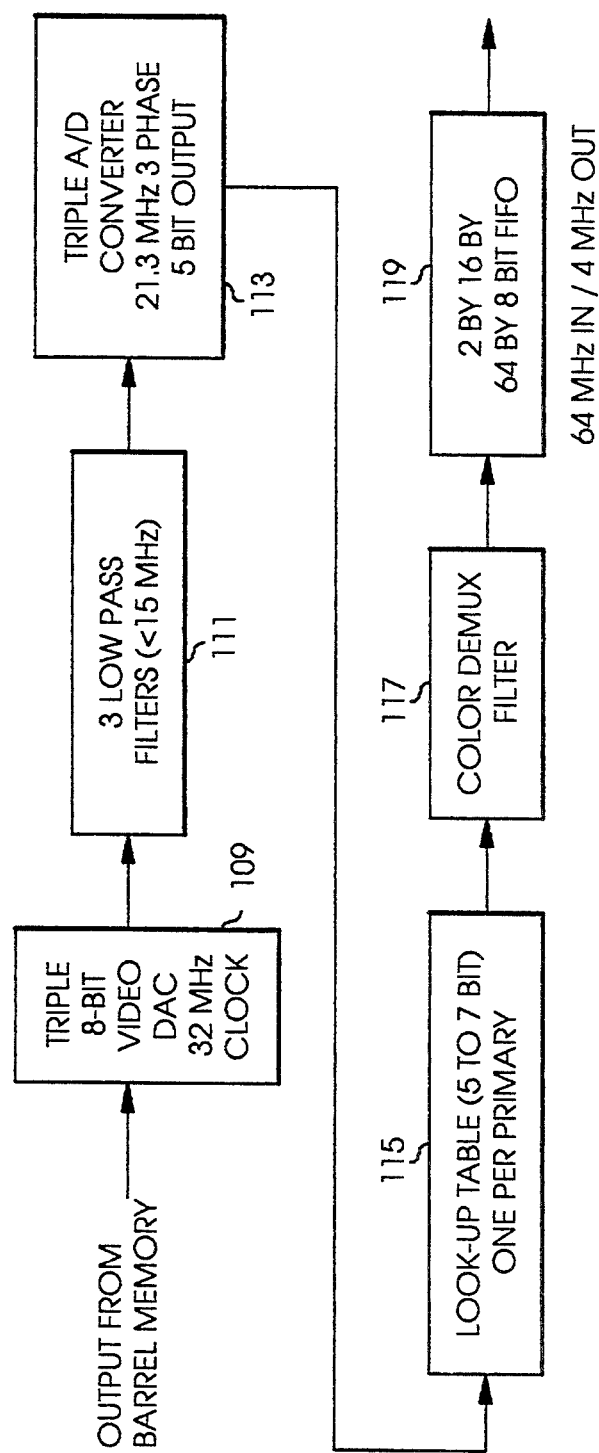
FIG. 2 is a block diagram showing an image reconstruction engine compatible with the present invention.

The image reconstruction engine 107 in the preferred analog design is simple in concept as illustrated by FIG. 2. As the LCD flat panel is rotated by 90°, the LCD flat panel driver signal data is scanned out of the barrel shifted memory as 1024 scan lines of 484 samples each. In order to reconstruct the image and display it on the LCD flat panel, the data stream preferably undergoes a fast D/A conversion 109 and is low pass filtered 111 to a level consistent with the desired display performance.

In order to determine the output bandwidth limit, the spatial frequency content and the available driving time must once again be considered. The desired spatial frequency in the 90° rotated axis is again 484 points per screen, or 242 cycles. The time available to each vertical column is found from the requirement to drive 1024 columns per frame at 60 frames per second. This time value is given by $1/(1024 \times 60)$ or 16.3 microseconds. Dividing 242 cycles per slit by 16.3 microseconds available gives a bandwidth of 14.9 MHz. The reconstructed vertical samples can therefore be filtered to below 15 MHz with no loss in fidelity. It will also be noted that the D/A process has its own set of bandwidth limitations, and that it is the composite of the conversion and an external low-pass filter in which it is desirable to have a flat response in low frequency and roll-off to substantially 3 dB at a frequency of substantially 15 MHz.

Finally, the bandwidth limited vertical column sample is preferably further sampled into 1024 dot samples by the A/D sampler 113. It may also be desirable at this point to take advantage of the panel design to reduce the data rates and clock speeds, although this is not essential to the inventive aspect of the present invention. The LCD flat panel can only display one of the three RGB primary colors at any sample point of the 1024 dot samples. Thus, a 3-phase 21.3 MHz clock can be used to drive the A/D sampler 113, giving correct samples of the data for the location to be displayed. The sample is truncated to 5 bits corresponding to the number of intensity levels that can be displayed by the LCD flat panel of the preferred embodiment, but it will be recognized that the intensity levels and the number of bits required to store them may vary with other types of panels. The 5 bits of the truncated sample are preferably converted by a look-up table 115 to 7 bits for the panel data, with the last bit being obtained by a complementing operation required to change display polarity.

The data now consists of three serial streams of 8 bits of video data. This is typically multiplexed to 16 parallel streams for transmission to the display module. For each point, only one of the three inputs are selected by the color demux (1 to 3 demultiplexer) 117 to be passed along to the FIFO delay lines 119 which provide for a single serial (1 to 3 demultiplexer) to 16 parallel data paths, each 8 bits wide. The FIFO 119 input clocks run at 64 MHz, whereas the output data is clocked to the display at 4 MHz.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The present invention is to be limited only in accordance with the scope of the appended claims, since others skilled in the art may devise other embodiments still within the limits of the claims.

The embodiments of the invention in which an exclusive property or right is claimed are defined as follows:

1. A video interface apparatus for conveying an incoming interlaced video signal to an outgoing non-interlaced video signal for an LCD flat panel with an arbitrary number of rows and columns, the apparatus comprising:
   (a) analog to digital (A/D) means for conveying the incoming analog video signal into a corresponding digital signal;
   (b) memory means connected to the A/D means for storing and outputting a plurality of rows of the digital signal;
   (c) read and write (R/W) address generator means connected to the memory means for generating addresses for reading and writing data from and into the memory means; and
   (d) image reconstruction means connected to the memory means for reconstructing the digital signal into an image for display on the LCD flat panel, having a digital to analog converter (DAC) means connected to the memory means for converting the digital signal output from the memory means to a corresponding analog signal, a line filtering means connected to the DAC means for filtering the analog signal to provide a smoothly varying analog signal, a second A/D means connected to the line filtering means for converting the smoothly varying analog signal into a corresponding LCD digital signal matching the display resolution of the LCD flat panel, a luminance correction means connected to the second A/D means for correcting the luminance of the LCD digital signal, a sequential read means connected to the luminance correction means for sequentially reading and outputting the corrected LCD digital signal, and an output memory means connected to the sequential read means for storing a row of the LCD digital signal and outputting the row to the LCD flat panel.

2. The video interface apparatus of claim 1, wherein the memory means comprises barrel shifted memory.

3. The video interface apparatus of claim 1, wherein:
   (a) the incoming video signal comprises a color video signal having red, green, and blue (RGB) components; and
   (b) the A/D means, memory means, R/W address generator means, and image reconstruction means are reproduced in triplicate to process the RGB components of the incoming color video signal.

4. The video interface apparatus of claim 1, wherein the line filtering means comprises a low pass filter (LPF).

5. The video interface apparatus of claim 1, wherein the luminance correction means comprises a look-up table.

6. The video interface apparatus of claim 1, wherein the sequential read means comprises a demultiplexer.

7. The video interface apparatus of claim 1, wherein the output memory means comprises first-in first-out (FIFO) memory.

8. The video interface apparatus of claim 1, wherein the DAC means, line filtering means, second A/D means, luminance correction means, sequential read means, and output means are reproduced in triplicate to process the RGB components of an incoming color video signal.

9. A video interface apparatus for converting an incoming interlaced video signal to an outgoing non-interlaced video signal for an LCD flat panel with an arbitrary number of rows and columns, the apparatus comprising:
   (a) first A/D means for converting the incoming analog video signal into a corresponding digital signal;
   (b) memory means connected to the first A/D means for storing and outputting a plurality of rows of the digital signal;
   (c) R/W address generator means connected to the memory means for generating addresses for reading and writing data from and into the memory means;
   (d) DAC means connected to the memory means for converting the digital signal output from the memory means to a corresponding analog signal;
   (e) line filtering means connected to the DAC means for filtering the analog signal to provide a smoothly varying analog signal;
   (f) second A/D means connected to the line filtering means for converting each the smoothly varying analog signal into a corresponding LCD digital signal matching the display resolution of the LCD flat panel;
   (g) luminance correction means connected to the second A/D means for correcting the luminance of the LCD digital signal;
   (h) sequential read means connected to the luminance correction means for sequentially reading and outputting the corrected LCD digital signal; and
   (i) output memory means connected to the sequential read means for storing a row of the LCD digital signal and outputting the row to the LCD flat panel.

10. The video interface apparatus of claim 9, wherein the memory means comprises barrel shifted memory.

11. The video interface apparatus of claim 9, wherein the line filtering means comprises an LPF.

12. The video interface apparatus of claim 9, wherein the luminance correction means comprises a look-up table.

13. The video interface apparatus of claim 9, wherein the sequential read means comprises a demultiplexer.

14. The video interface apparatus of claim 9, wherein the output memory means comprises FIFO memory.

15. The video interface apparatus of claim 9, wherein:
   (a) the incoming video signal comprises a color video signal having red, green, and blue (RGB) components; and
   (b) the first A/D means, memory means, R/W address generator means, DAC means, line filtering means, second A/D means, luminance correction means, sequential read means, and output means are reproduced in triplicate to process the RGB components of the incoming color video signal.

16. A video interface apparatus for converting an incoming interlaced video signal to an outgoing non-interlaced video signal for an LCD flat panel with an arbitrary number of rows and columns, the apparatus comprising:
   (a) first A/D means for converting the incoming analog video signal into a corresponding digital signal;

(b) barrel shifted memory means connected to the first A/D means for storing and outputting a plurality of rows of the digital signal;

(c) R/W address generator means connected to the barrel shifted memory means for generating addresses for reading and writing data from and into the barrel shifted memory means;

(d) DAC means connected to the barrel shifted memory means for converting the digital signal output from the barrel shifted memory means to a corresponding analog signal;

(e) LPF means connected to the DAC means for filtering the analog signal to provide a smoothly varying analog signal;

(f) second A/D means connected to the LPF means for converting the smoothly varying analog signal into a corresponding LCD digital signal matching the display resolution of the LCD flat panel;

(g) luminance correction means connected to the second A/D means for correcting the luminance of the LCD digital signal;

(h) demultiplexer means connected to the luminance correction means for sequentially reading the corrected LCD digital signal; and (i) FIFO memory means connected to the demultiplexer means for storing a row of the LCD digital signal and outputting the row to the LCD flat panel.

17. The video interface apparatus of claim 16, wherein the luminance correction means comprises a look-up table.

18. The video interface apparatus of claim 16, wherein:

(a) the incoming video signal comprises a color video signal having red, green, and blue (RGB) components; and (b) the first A/D means, barrel shifted memory means, R/W address generator means, DAC means, LPF means, second A/D means, luminance correction means, demultiplexer means, and FIFO memory means are duplicated in triplicate to process the RGB components of the incoming color video signal.

* * * * *